Figure 1:
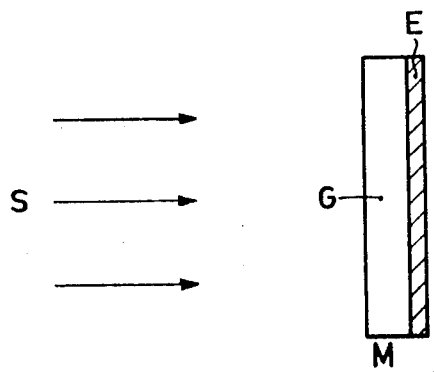

United States Patent
Dammann

[11] 3,767,284
[45] Oct. 23, 1973

[54] METHOD OF MANUFACTURING A HOLOGRAM BY MEANS OF NONLINEAR RECORDING MATERIALS

[75] Inventor: Hans Dammann, Tangstedt, Germany

[73] Assignee: U.S. Philips Corporation, New York, N.Y.

[22] Filed: Aug. 24, 1971

[21] Appl. No.: 174,356

[52] U.S. Cl............................. 350/3.5, 350/162 SF
[51] Int. Cl............................................. G02b 27/00
[58] Field of Search .................. 350/3.5, 162 SF; 356/71

[56] References Cited
UNITED STATES PATENTS 3,572,880  3/1971  Negrelli ................. 350/3.5
3,539,242  11/1970  Burch et al. ............ 350/3.5

Primary Examiner—David Schonberg
Assistant Examiner—Ronald J. Stern
Attorney—Frank R. Trifari

[57] ABSTRACT

A method as described of manufacturing a hologram by means of non-linear recording materials. It is proved that the influence of a disturbing exposure distribution can substantially be eliminated by composing said exposure distribution with an auxiliary exposure to a spatially constant exposure.

2 Claims, 3 Drawing Figures

INVENTOR.
HANS DAMMANN

METHOD OF MANUFACTURING A HOLOGRAM BY MEANS OF NONLINEAR RECORDING MATERIALS

The invention relates to a method of manufacturing a hologram by means of non-linear recording materials.

A non-linear recording material is to be understood to mean herein a recording material which shows a non-linear relationship between the intensity with which the material is exposed to light and the amplitude transfer resulting from said exposure.

As is known, a disturbance-free reconstruction of a hologram in holography is possible only if a linear relationship exists between the amplitude transfer of the manufactured hologram and the light intensity with which the hologram is recorded. For the materials used in practice, only a very small part of the curve which shows the relationship between the amplitude transfer and the intensity of the exposure is linear. Therefore the modulation depth has to be restricted as a result of which the efficiency of the hologram is low.

It is the object of the invention to provide a method of manufacturing a hologram by means of non-linear recording material, in which the above-mentioned drawback is avoided. For that purpose, the method according to the invention is characterized in that during the recording of the hologram, the disturbing terms of the final hologram are made into spatially constant terms by means of an auxiliary linear recording.

By using the method according to the invention it is possible to vary the intensity over a large range since the disturbance which is a result of the fact that the amplitude transfer shows a quadratic dependence on the intensity is eliminated.

The invention can best be explained with reference to a few simple mathematical formulae.

The intensity distribution occurring in recording a hologram can in most cases be represented by $$I(x,y) = A^2 + \{a(x,y)\}^2 + 2Aa(x,y) \cos \{\phi(x,y)\} \quad (1)$$

where $\phi(x,y)$ is the intensity distribution,
$A^2$ the intensity of the reference wave,
and $\{a(x,y)\}^2$ the intensity of the signal wave originating from the object to be recorded. In this equation the last term represents the holographic information.

The distribution of the amplitude transfer in the hologram is a function of the intensity distribution $I(x,y)$. In a no longer small modulation this function generally is non-linear, and then has, for example, the following form:

$$t(x,y) = c\,I(x,y) + d\,\{I(x,y)\}^2 \quad (2)$$

$c$ and $d$ are constants which may also be complex.

A non-linearity represented by the second term of equation (2) also occurs in phase holograms which are manufactured for example, by bleaching of photographic emulsions. It is known that disturbances in the reconstructed image can be obtained by the occurence of the quadratic term $d\cdot\{I(x,y)\}^2$ if the function $\{a(x,y)\}^2$ in equation (1) is not constant. The intensity $\{a(x,y)\}^2$ of the signal wave $a(x,y)$ usually is not constant and therefore represents a disturbing light distribution.

In the method according to the invention, the disturbing influence of the fluctuations of the function $\{a(x,y)\}^2$ is avoided in that a light distribution of the form:

$$I_z(x,y) = C^2 - \{a(x,y)\}^2$$

is superimposed upon the light distribution according to equation (1). In this formula $C^2$ is a constant. The holographic recording material will react to this as if it were exposed with the sum of both light distributions, for example, as is known for photographic materials. Of this sum $I(x,y) + I_z(x,y) = A^2 + C^2 + 2A\,a(x,y) \cos \{\phi(x,y)\}$ all the terms except the last which represents the holographic information are constant. In a non linear recording, said terms cause no disturbances.

Figure 2:
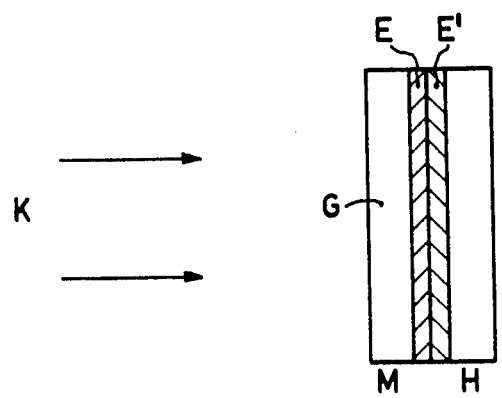
Figure 3:
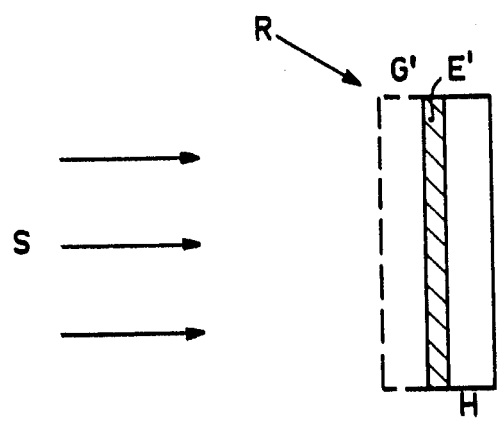

The invention will now be described with reference to the drawing in which FIGS. 1, 2 and 3 show the successive stages of the method according to the invention. As a holographic recording material a photographic plate is used.

As a first step in the recording (see FIG. 1), a mask M is manufactured the intensity transmission $T_M(x,y)$ of which is linked up in a linear or substantially linear manner with the intensity of the signal wave so that it holds that:

$$T_M(x,y) = T_o - \beta \{a(x,y)\}^2 \quad (3)$$

$T_o$ and $\beta$ are constants. The linearity requirement for equation (3) is far less stringent than that in recording the hologram itself since the intensity range is not as extensive as that of a holographic interference pattern. In manufacturing the mask exposure is carried out through the glass plate G so as to be able in the next step to readily contact the emulsion E with the photosensitive layer $E'$ of the holographic plate H.

As a second step a contact exposure with the mask M is made on the holograph plate H (see FIG. 2). The exposure distribution $E_1(x,y)$ in the holograph plate H then is $$E_1(x,y) = \tau_1 D^2 [T_o - \beta \{a(x,y)\}^2] \quad (4)$$

wherein $\tau_1$ is the exposure time and $D^2$ the constant intensity of the contact exposure K.

As a third step (see FIG. 3) the mask M is removed and the holographic plate H is exposed in the conventional manner by the signal wave S and the reference wave R, the exposure distribution $$E(x,y) = \tau\,I(x,y)$$

being formed in which $\tau$ is the exposure time, $I(x,y)$ being given by equation (1).

In order to expose under the same optic conditions as in manufacturing the mask, a transparent glass plate $G'$ is provided.

The overall exposure of the holograph plate is the sum of the separate exposures.

$E_1(x,y) + E(x,y) = \tau_1 D^2 [T_o - \beta \{a(x,y)\}^2] + \tau[A^2 + \{a(x,y)\}^2 + 2A\,a(x,y) \cos \phi(x,y)] = \tau A^2 + \tau_1 T_o D^2 + \{a(x,y)\}^2 [\tau - \tau_1 D^2 \beta] + 2\tau A a(x,y) \cos \{\phi(x,y)\}.$ If $\tau$ is chosen to be equal to $\tau_1 D^2 \beta$, the influence of the disturbing light distribution $\{a(x,y)\}^2$ is eliminated. Thus, the exposure of the mask, the contact exposure and the holographic exposure may be predetermined.

The holographic information may also be recorded entirely or partly as phase information instead of as amplitude information.

What is claimed is:

1. A method of holographically recording an image of a coherently illuminated object with a recording medium that is non-linear over exposure ranges exceeding a predetermined value, comprising the steps of exposing an intermediate recording medium to coherent radiation from the object in a substantially linear range of the intermediate recording medium, transferring the intermediate recording on to a final recording medium in a substantially linear range of the final recording medium by projecting a uniform constant intensity beam through said intermediate recording and onto said final recording medium, and subsequest to the transfer, discarding said intermediate recording medium and exposing the final recording medium simultaneously to the coherent radiation from the object which radiation is identical to that used to expose the intermediate recording medium and to a uniform coherent reference beam of radiation only, the exposure time of the step of exposing the final recording medium to the object and reference beams being equal to the exposure time of the intermediate recording multiplied by the constant intensity of the beam used for transferring the intermediate recording and the transfer characteristic $\beta$ of the intermediate recording medium, the relative positions of the object and intermediate recording medium being identical to the relative positions of the object and the final recording medium.

2. A method as claimed in claim 1, wherein the step of transferring the intermediate recording to the final recording medium comprises the step of contact printing.

* * * * *